(12) United States Patent
Kim et al.

(10) Patent No.: US 9,600,139 B2
(45) Date of Patent: Mar. 21, 2017

(54) ELECTRONIC DEVICE AND METHOD FOR IMPLEMENTING USER INTERFACES ASSOCIATED WITH TOUCH SCREENS

(75) Inventors: Hyun Jin Kim, Seoul (KR); Ji Yeon Kwak, Seoul (KR); Yong Gook Park, Yongin-si (KR); Soo Yeoun Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 12/641,296

(22) Filed: Dec. 17, 2009

(65) Prior Publication Data
US 2010/0153876 A1 Jun. 17, 2010

(30) Foreign Application Priority Data
Dec. 17, 2008 (KR) .................. 10-2008-0128383

(51) Int. Cl.
*G06F 3/0488* (2013.01)
*G06F 3/0482* (2013.01)

(52) U.S. Cl.
CPC ........ *G06F 3/0482* (2013.01); *G06F 3/04886* (2013.01)

(58) Field of Classification Search
CPC ................. G06F 3/04886; G06F 3/0488
USPC ........................................................ 715/800
See application file for complete search history.

(56) References Cited

U.S. PATENT DOCUMENTS

| | | | |
|---|---|---|---|
| 4,862,498 A * | 8/1989 | Reed ........................ | 379/355.09 |
| 5,923,327 A | 7/1999 | Smith et al. | |
| 6,664,991 B1 * | 12/2003 | Chew et al. .................. | 715/863 |
| 6,683,633 B2 * | 1/2004 | Holtzblatt et al. ............ | 715/854 |
| 6,803,906 B1 | 10/2004 | Morrison et al. | |
| 7,434,177 B1 * | 10/2008 | Ording et al. ................ | 715/862 |
| 7,499,035 B2 * | 3/2009 | Kolmykov-Zotov et al. ............................. | 345/173 |
| 2004/0012573 A1 * | 1/2004 | Morrison et al. ............. | 345/173 |
| 2004/0210844 A1 * | 10/2004 | Pettinati ................. | G06Q 10/10 715/708 |

(Continued)

FOREIGN PATENT DOCUMENTS

| | | |
|---|---|---|
| CN | 1941971 | 4/2007 |
| CN | 101226443 | 7/2008 |

(Continued)

OTHER PUBLICATIONS

European Search Report for corresponding Ep Application No. 09179407.3-2224/2199895 dated Dec. 19, 2012.

(Continued)

*Primary Examiner* — Doon Chow
*Assistant Examiner* — Conrad Pack
(74) *Attorney, Agent, or Firm* — H.C. Park & Associates, PLC

(57) ABSTRACT

An electronic device and a user interface implementing method therein are disclosed. The method includes displaying at least one content, displaying a shortcut key corresponding to the at least one content if close contact is detected, and executing a function corresponding to the at least one content if the shortcut key is selected. The shortcut key can invoke a function corresponding to the at least one content if an input tool closely approaches the at least one content in an area on the touch screen and is located within a distance from the surface of the touch screen.

15 Claims, 3 Drawing Sheets

(56) References Cited

U.S. PATENT DOCUMENTS

| | | | |
|---|---|---|---|
| 2004/0212617 A1* | 10/2004 | Fitzmaurice et al. | 345/440 |
| 2005/0015728 A1* | 1/2005 | Ragan et al. | 715/765 |
| 2005/0024322 A1 | 2/2005 | Kupka | |
| 2005/0091609 A1* | 4/2005 | Matthews et al. | 715/804 |
| 2005/0114778 A1* | 5/2005 | Branson et al. | 715/711 |
| 2006/0010400 A1* | 1/2006 | Dehlin et al. | 715/856 |
| 2006/0022955 A1 | 2/2006 | Kennedy | |
| 2006/0109252 A1* | 5/2006 | Kolmykov-Zotov et al. | 345/173 |
| 2006/0161871 A1* | 7/2006 | Hotelling et al. | 715/863 |
| 2006/0267953 A1* | 11/2006 | Peterson et al. | 345/173 |
| 2007/0067798 A1* | 3/2007 | Wroblewski | G06F 3/0346 725/37 |
| 2007/0162953 A1* | 7/2007 | Bolliger et al. | 725/142 |
| 2008/0055263 A1* | 3/2008 | Lemay | H04M 1/72522 345/173 |
| 2008/0154738 A1* | 6/2008 | Jain et al. | 705/26 |
| 2008/0158170 A1* | 7/2008 | Herz et al. | 345/173 |
| 2008/0168403 A1* | 7/2008 | Westerman et al. | 715/863 |
| 2008/0174562 A1 | 7/2008 | Kim | |
| 2008/0229197 A1* | 9/2008 | Branson et al. | 715/705 |
| 2009/0164062 A1 | 6/2009 | Aoki et al. | |
| 2009/0251439 A1* | 10/2009 | Westerman et al. | 345/175 |
| 2010/0093316 A1* | 4/2010 | Doppler | H04M 1/72522 455/414.1 |

FOREIGN PATENT DOCUMENTS

| | | |
|---|---|---|
| JP | 2004-038894 | 2/2004 |
| JP | 2006-039745 | 2/2006 |
| JP | 2007-290562 | 11/2007 |
| JP | 2008-250948 | 10/2008 |
| JP | 2008-287323 | 11/2008 |
| KR | 2006-0009706 | 2/2006 |
| KR | 10-2007-0107888 | 11/2007 |
| WO | 01/46790 | 6/2001 |

OTHER PUBLICATIONS

Chinese Office Action dated Jun. 6, 2013 issued for Chinese Patent Application No. 200910258223.7.
Korean Office Action dated Mar. 23, 2015, in Korean Patent Application No. 10-2008-0128383.
Korean Office Acion dated Mar. 21, 2016, in Korean Patent Application No. 10-2015-0187240.

* cited by examiner

ELECTRONIC DEVICE AND METHOD FOR IMPLEMENTING USER INTERFACES ASSOCIATED WITH TOUCH SCREENS

CROSS REFERENCE TO RELATED APPLICATION

This application claims priority from and the benefit of Korean Patent Application No. 10-2008-0128383, filed on Dec. 17, 2008, which is hereby incorporated by reference for all purposes as if fully set forth herein.

BACKGROUND OF THE INVENTION

Field of the Invention

Exemplary embodiments of the present invention relate to a user interface and an electronic device and method for implementing the user interface through a touch screen.

Description of the Background

Electronic devices can be provided with various user interfaces to allow users to conveniently control operations on the devices through the user interfaces. These devices can also allow users to utilize functions via the user interfaces.

In recent years, electronic devices have been developed to serve a variety of functions. With the advancement of technology, the sizes of electronic devices have also become smaller. As electronic devices become smaller, a manipulating key or a mouse, may serve as an input device to a user interface. The input device may select functions through a touch screen. While touch screen technology is still improving, conventional electronic devices do not allow for the implementation of a variety of user interfaces, thereby limiting user satisfaction. Therefore, to improve user satisfaction, various types of user interfaces may need to be developed.

SUMMARY OF THE INVENTION

Exemplary embodiments of the present invention provide an electronic device and method for implementing user interfaces through a touch screen.

Additional features of the invention will be set forth in the description which follows, and in part will be apparent from the description, or may be learned by practice of the invention.

Exemplary embodiments of the present invention disclose a method including displaying content in an area of a touch screen, displaying, on the touch screen, a shortcut key to execute a function corresponding to the content. The shortcut key is displayed in response to detection of a close contact. The close contact is detected if an input tool is located within a distance of the area. The method further includes executing the function corresponding to the content if the shortcut key is selected.

Exemplary embodiments of the present invention disclose an electronic device including a sensing unit, a display unit, and a controller. The sensing unit detects a close contact. The close contact is detected in response to an input tool being located within a distance of an area of a touch screen of a device. The display unit displays the content in the area and a shortcut key associated with the content. The shortcut key is displayed in response to detection of the close contact. The controller controls the display unit to display the content and the shortcut key associated with the content, and executes a function corresponding to the content in response to selection of the shortcut key.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
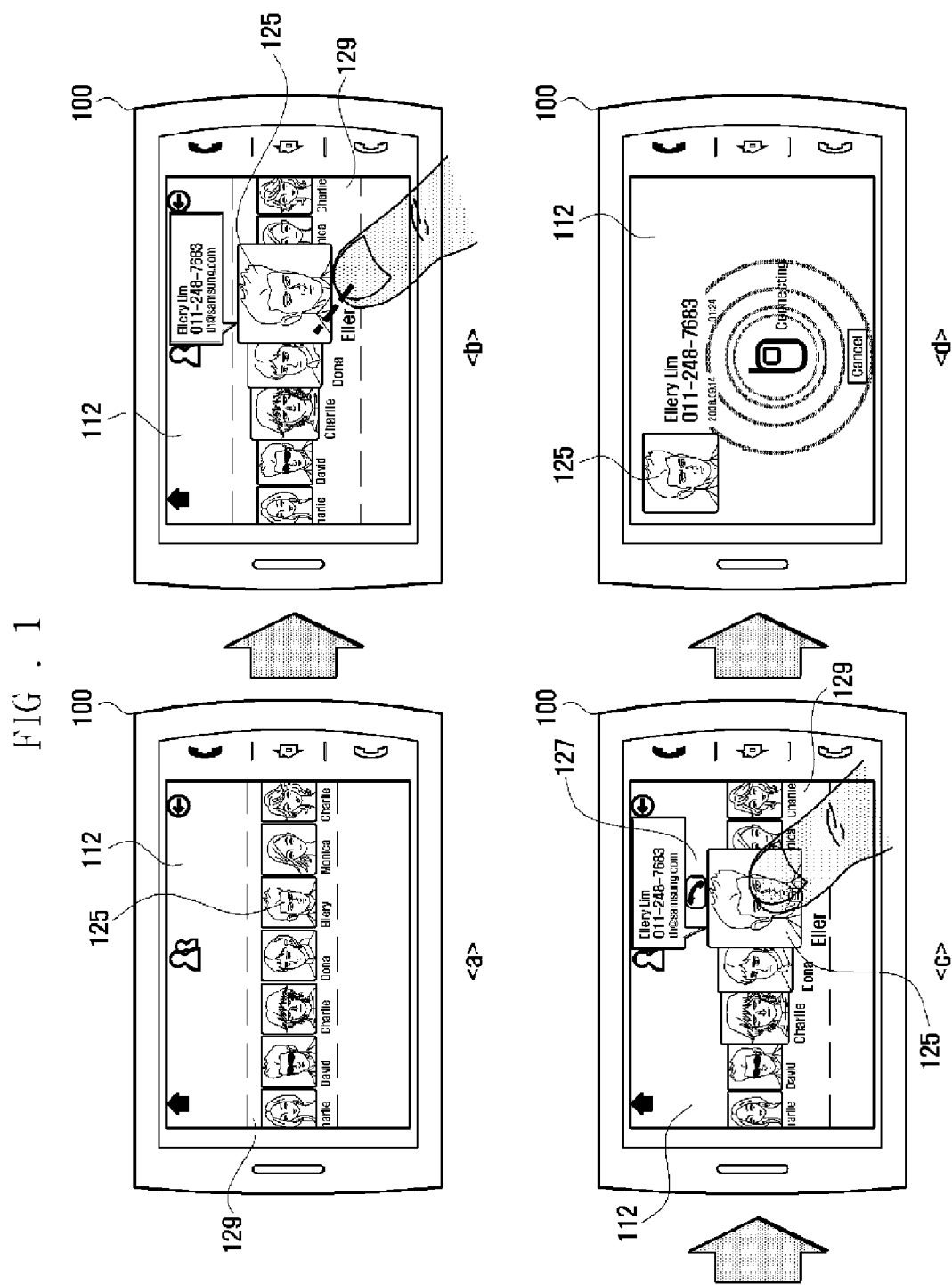
FIG. 1 illustrates screens according to touches detected on a touch screen according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. Detailed descriptions of well-known functions and structures incorporated herein may be omitted to avoid obscuring the subject matter of the present invention.

Prior to explaining exemplary embodiments of the present invention, terminologies will be defined for the description below. The terms or words described in the description below and the claims should not be limited by a general or lexical meaning, instead should be analyzed as a meaning and a concept through which the inventor may define and describe exemplary embodiments of the present invention.

An 'electronic device' may refer to a device that can perform a variety of operations, such as, for example, a data generating operation, and a data storing operation. The electronic device can perform communication with other electronic devices. An electronic device may include a variety of devices that can process a variety of data and communicate with other devices by transmitting and receiving data. Examples of an electronic device include, but are not limited to, a computer, a mobile communication terminal, an MP3 player, and a portable multimedia player (PMP).

'Content display mode' may refer to a mode that can display data stored in the electronic device. Examples of a content display mode may include a phonebook search or display mode for displaying phonebook data, a menu mode for selecting a menu, and a mode for displaying images or music files stored in the storage unit.

A 'shortcut key' may refer to a key displayed as an icon for a user interface. The shortcut key can immediately invoke a particular function corresponding to at least some content.

A 'close contact' may refer to a type of touch that can be detected by a sensing unit of a touch screen. Close contact may also refer to a state where an input tool, such as, for example, a user's finger or a stylus, may not contact the surface of the touch screen, but is located within a certain distance of the touch screen surface.

Hereinafter, exemplary embodiments of the present invention are described in detail with reference to the accompanying drawings.

FIG. 1 illustrates screens <a>, <b>, <c>, and <d> of an electronic device 100 according to touches detected through a touch screen, according to exemplary embodiments of the present invention.

As shown in FIG. 1<a>, the display unit 112 of an electronic device 100 may display content 129 on a display unit 112 according to an electronic device user's selection. For example, if the user selects a phonebook search item to search for phonebook data from a storage unit of the electronic device 100, the display unit 112 may display images corresponding to the phonebook data stored in the storage unit, as shown in FIG. 1<a>. If the user selects a menu, the display unit 112 may display icons corresponding to the menu.

When the display unit 112 detects close contact to a touch screen of the electronic device 100, the display unit 112 may enlarge corresponding content 125, and may display the corresponding content 125 proximate to where the close contact is detected, as shown in FIG. 1<b>. The display unit 112 can also display detailed information regarding the enlarged content 125. For example, if detailed information is available as phonebook data for the content 125, the display unit 112 may display the detailed information regarding the content 125 in a pop-up message, as shown in FIG. 1<b>. The detailed information may include, for example, names, phone numbers, and email addresses of the user and of the user's contacts. If the content 125 is implemented with a menu, the display unit 112 may display a pop-up message describing which function corresponding to the menu can be executed.

If a time period for detecting close contact to the touch screen is equal to or greater than a preset time period, the display unit 112 may display a shortcut key 127, as shown in FIG. 1<c>. The shortcut key 127 may be located above the area where the content 125 is displayed. In some cases, the shortcut key 127 may be superimposed on the content 125.

The shortcut key 127 may refer to a key that invokes a frequently performed function through content 125 in the electronic device 100.

If content 125 is implemented with phonebook data and a function, for example, a voice call function, is frequently executed for a selected phonebook data, the display unit 112 may display a voice call key, which can invoke the voice call function, as a shortcut key, as shown in FIG. 1<c>. In some cases, if a message writing function is frequently executed for a selected phonebook data, the display unit 112 may display a message writing key, which can invoke a message writing function, as a shortcut key 127.

If content 125 is implemented with a menu, the display unit 112 may display a shortcut key 127 that can invoke a frequently executed function through the menu. In some cases, the display unit 112 may display a shortcut key 127 that can invoke the highest ranked submenu contained in the menu.

The display unit 112 can display a function executed through a shortcut key 127, as shown in FIG. 1<d>. For example, if a voice call key represented by a shortcut key 127 is displayed on the display unit 112, the user may select the shortcut key 127 through the touch screen. The electronic device 100 may then execute a voice call function using a phone number contained in the phonebook data that corresponds to the content 125. The display unit 112 can also display a screen showing when the voice call function is executed, as shown in FIG. 1<d>.

Figure 2:
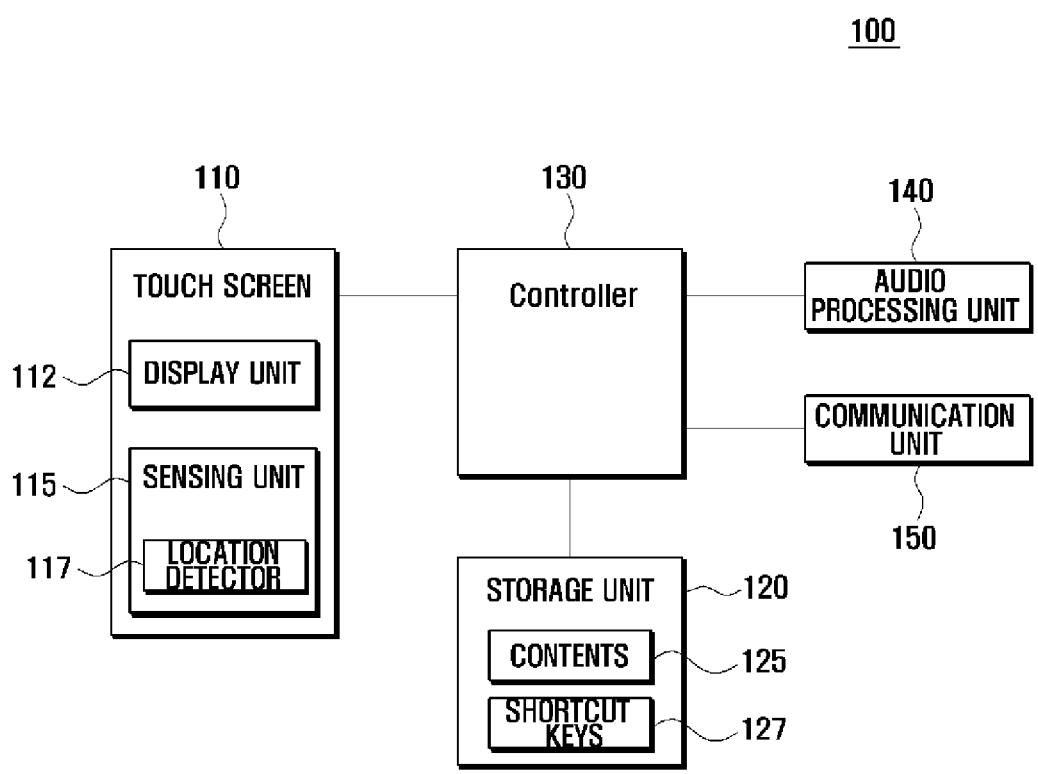
FIG. 2 is a schematic block diagram illustrating an electronic device according to exemplary embodiments of the present invention.

A description of the electronic device 100 with reference to FIG. 2 is provided hereinbelow. The electronic device 100 may execute a variety of functions according to types of touch that are detected through the touch screen.

FIG. 2 is a schematic block diagram illustrating an electronic device 100 according to exemplary embodiments of the present invention.

Referring to FIG. 2, the electronic device 100 may include a touch screen 110, a storage unit 120, a controller 130, an audio processing unit 140, and a communication unit 150.

The touch screen 110 may include a display unit 112 and a sensing unit 115.

The display unit 112 may display a variety of information related to the states and operations of the electronic device 100. For example, the display unit 112 may display contents 129 stored in the storage unit 120 under the control of the controller 130. When close contact is detected by the sensing unit 115, the display unit 112 may display detailed information regarding content 125 proximate to an area where the close contact is detected, under the control of the controller 130. The display unit 112 can also enlarge the mapped content 125 to distinguish the content 125 from other contents 129, and may display the content 125 proximate to the area where the close contact is detected. If the close contact is retained for a preset time period, the display unit 112 can display, under the control of the controller 130, a shortcut key 127 corresponding to a frequently executed function using the content 125. If the shortcut key 127 is selected, the display unit 112 may display a screen associated with the frequently executed function.

The sensing unit 115 may be coupled with the display unit 112. The sensing unit 115 may include a location detector 117 that can detect a location of contact or close contact by the input tool (e.g., a user's finger or stylus). The sensing unit 115 may sense a change in capacitance as the input tool contacts or closely contacts the surface of the touch screen 110. The sensing unit 115 may be implemented with various types of touch sensors. For example, the sensing unit 115 may be implemented with capacitive touch sensors.

When an input tool contacts or closely contacts the surface of the touch screen 110, the sensing unit 115 may detect the changed capacitance and may output a sensing signal to the controller 130. The controller 130 may determine whether the input tool contacts or closely contacts the touch screen 110, based on the capacitance value provided by the sensing signal provided by the sensing unit 115.

The storage unit 120 may store application programs for executing a variety of functions in the electronic device 100 and a variety of contents 129 generated as programs in the electronic device 100 are executed. The storage unit 120 may store information associated with shortcut keys 127 set by contents 129. The storage unit 120 can also store the execution frequency of each of the functions associated with corresponding contents 129 based on information required to set the shortcut keys 127. The storage unit 120 may store first and second threshold values. The first threshold value may help determine whether an input tool closely contacts the surface of the touch screen 110, and the second threshold value may help determine whether an input tool contacts the surface of the touch screen 110. The first threshold value may be smaller than the second threshold value. The first and second threshold values may be set either when the electronic device 100 is manufactured or by the user. In some cases, the first threshold value and the second threshold value may correspond to capacitance values.

The controller 130 may control the operations of the components (e.g., communication unit 150, touch screen 110) in the electronic device 100. The controller 130 may control the display unit 112 to display contents 129 selected by the user. For example, if a user selects a mode, such as a phonebook search or display mode, a menu selection mode, a mode for displaying images or music files stored in the storage unit 120, the controller 130 may instruct the display unit 112 to display content 129 corresponding to the selected mode. The controller 130 may determine whether an input tool contacts or closely contacts the touch screen 110.

The controller 130 may determine whether an input tool contacts or closely contacts the touch screen 110 by identifying the changed capacitance and the area where the capacitance is changed, through the touch screen 110. The controller 130 may then determine whether the input tool has contacted or close contacted the touch screen 110 by comparing the changed capacitance with the first and second threshold values stored in the storage unit 120. The controller 130 may determine that close contact has occurred on the touch screen 110 if the changed capacitance is equal to or greater than the first threshold value. The controller 130 may determine that contact has occurred on the touch screen 110 if the changed capacitance is equal to or greater than the second threshold value.

When the controller 130 detects close contact through the touch screen 110, the controller 130 may identify content 125 mapped to an area where the close contact is detected. The controller 130 may then determine whether the changed capacitance is retained for a preset time period. For instance, the controller 130 may measure a time period that the changed capacitance is retained using, for example, a timer. The controller 130 may determine whether the measured time period is equal to or greater than the preset time period. If the controller 130 determines that the measured time period is equal to or greater than the preset time period, the display unit 112, under control of the controller 130, may display a shortcut key 127 related to the identified content 125. If the shortcut key 127 is selected, the controller 130 may execute a function corresponding to the selected shortcut key 127 using the identified content 125.

The shortcut key 127 may refer to a function key that immediately invokes a frequently-used function through content 125. The controller 130 may track or count the executed frequency of a function each time the function is executed through content 125, and may then store the count in the storage unit 120. For example, if the content 125 is implemented with a phonebook, a voice call function may be frequently used in conjunction with a particular phone number. The controller may count the calling frequency of the particular phone number, and may then store the count in the storage unit 120.

The controller 130 may generate shortcut keys 127 according to the stored, executed frequency of the corresponding functions. For example, the controller 130 may identify the executed frequency of functions associated with contents 129 stored in the storage unit 120, and may generate a shortcut key 127 that can invoke a function having the highest executed frequency. The controller 130 may associate the generated shortcut key 127 with the corresponding content 125 and store the shortcut key 127 in the storage unit 120. In some cases, if content 125 is implemented with a menu, and a submenu of the menu is displayed on the display unit 112, the controller 130 may set the highest item of the submenu as the shortcut key 127. Accordingly, the shortcut key 127 can correspond to any suitable function according to the user's choice or electronic device manufacturer settings.

The audio processing unit 140 may include a microphone and a speaker. The audio processing unit 140 may convert an audio signal input through the microphone to audio data and may output the audio data to the controller 130. The audio processing unit 140 may also convert audio data from the controller 130 to an audio signal, and may output the audio signal through the speaker.

The communication unit 150 may allow the electronic device 100 to communicate with other devices. For example, the electronic device 100 can perform short-range wireless communication, such as Bluetooth® communication and/or radio frequency communication, via the communication unit 150. The electronic device can also perform a voice call with a base station.

In the following description, a method for executing functions associated with content 125 is described with reference to FIG. 3.

Figure 3:
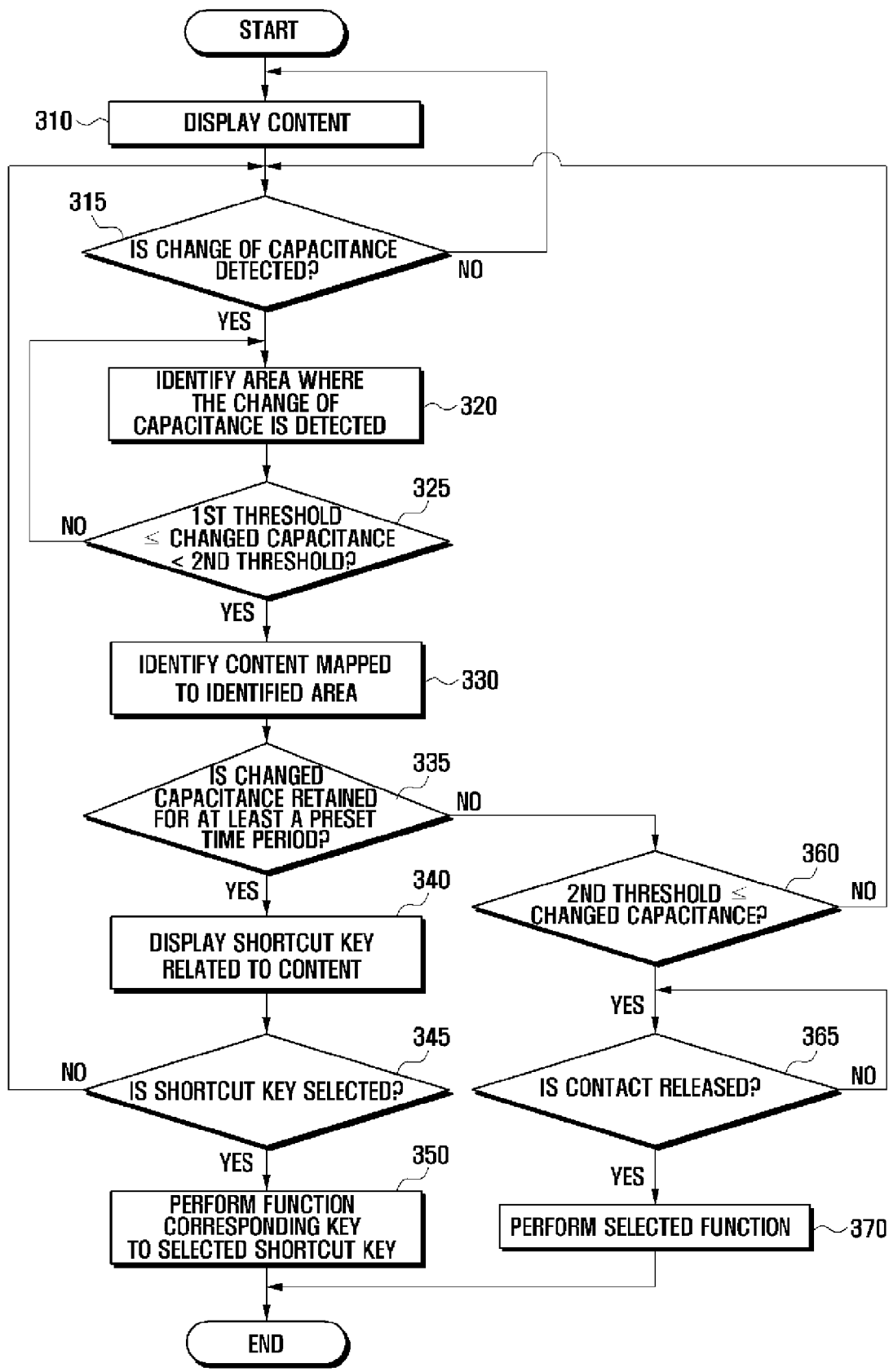
FIG. 3 is a flow chart illustrating a method for executing functions according to exemplary embodiments of the present invention.

FIG. 3 is a flow chart that describes a method for executing functions according to exemplary embodiments of the present invention.

Referring to FIG. 3, when content 125 is selected, the controller 130 may instruct the display unit 112 to display the selected content (310). Content 125 may be selected when an input tool contacts or closely contacts a surface of the touch screen 110. The controller 130 may then determine whether a change in capacitance is detected through the touch screen 110 (315).

If the controller 130 does not detect a change in capacitance, the display unit 112 may continue to display the selected content. If the controller 130 detects a change in capacitance, the controller 130 may identify an area where the change in capacitance has been detected (320). The controller 130 can determine the changed capacitance using the touch screen 110. The controller 130 may then compare the changed capacitance value with the first and second threshold values to determine whether an input tool closely contacts the touch screen 110 (325). The first threshold value may refer to a capacitance value that determines whether the input tool closely contacts the surface of the touch screen 110. The second threshold value may refer to a capacitance value that determines whether the input tool contacts the surface of the touch screen 110.

If the controller 130 determines that the changed capacitance is less than the first threshold value, the controller 130 may return to step 320.

If the controller 130 determines that the changed capacitance is equal to or greater than the first threshold value, but less than the second threshold value, the controller 130 may determine that the input tool closely contacts the touch screen 110 and may identify the content 125 mapped to an area where the change in the capacitance has been detected (330). The identified content 125 may be at least some of the contents 129 displayed on the display unit 112. The controller 130 may then determine whether the changed capacitance is retained for at least a preset time period (335).

If the controller 130 determines that the changed capacitance is retained for at least a preset time period at step 335, the display unit 112 may display a shortcut key 127 related to the identified content 125 (340). The controller 130 may superimpose and display the shortcut key 127 on or above the content 125. The shortcut key 127 may refer to a function key that can invoke a frequently-executed function associated with content 125. In some cases, one or more shortcut keys may be displayed on the display unit 112. For example, if the content 125 is associated with a phone number, the displayed shortcut keys may include a voice call key for invoking a voice call function and a message-writing key allowing for the writing and transmitting of a message. The shortcut keys can be displayed in a decreasing or increasing order of execution frequency by comparing the execution frequency of all the functions corresponding to the content 125.

After displaying one or more shortcut keys at step 340, the controller 130 may determine whether a shortcut key is selected (345). If the controller 130 detects that an input tool contacts, through the touch screen 110, and then releases an area where the shortcut key is displayed, the controller 130 may execute a function corresponding to the selected shortcut key (350). For example, if the selected shortcut key corresponds to a voice call key, the controller 130 may perform a voice call using a number provided by the content 125.

If, in step 335, the controller 130 determines that the changed capacitance is not retained for a preset time period, the controller 130 may determine whether the changed capacitance is equal to or greater than the second threshold value (360). If the controller 130 determines that the changed capacitance is equal to or greater than the second threshold value at step 360, the controller 130 may determine that the input tool contacts the surface of the touch screen 110. The controller 130 may then determine whether the contact is released from the touch screen 110 (365). If the controller 130 determines that the contact has been released from the touch screen 110 at step 365, the controller 130 may determine that content 125 has been selected, and the controller 130 may execute a function corresponding to the content 125 mapped to the area where the contact and release is determined (370). For example, if the content 125 is implemented with phonebook data, the controller 130 may display detailed information contained in the selected phonebook data, such as, for example, a phone number, a name, and an email address, on the display unit 112. After the touch and release is determined, the controller 130 can execute a selected function, such as a phonebook edit, deletion, and/or addition of information. In some cases, if the content is implemented with a menu, the controller 130 may display submenus corresponding to a selected menu on the display unit 112. After the touch and release is determined, the controller 130 may execute a function corresponding to a selected submenu.

As described above, the user can conveniently select functions corresponding to the contents 129 displayed on the display unit 112. Accordingly, to execute a function, the user does not need to perform a plurality of steps but can select only some of corresponding content 125 from the display unit 112.

Although, in the description provided hereinabove, the content 129 displayed on the display unit 112 may be menu or phonebook-related content, exemplary embodiments of the present invention are not limited thereto. For example, if the electronic device 100 has a navigation function, the content 125 may be a map. The controller 130 may display the map for performing a navigation function on the display unit 112 of the electronic device 100. The map may show a visual representation of a geographical area and addresses mapped to buildings, residential districts, and/or places in the geographical area. When close contact is detected via a touch screen 110, the controller 130 may identify an address mapped to an area where the close contact is detected. The controller 130 may then display the identified address on the display unit 112. When the close contact is retained for a preset time period, the controller 130 may display a path guide key as a shortcut key 127 on the display unit 112. If the shortcut key 127 (e.g., the path guide key) is selected, the controller 130 may display a path on the map using the identified address. Although the path guide function refers to a function that guides the user to a destination using an identified address, exemplary embodiments of the present invention are not limited thereto. For example, the path guide function may provide a path to or from the identified address to an address registered by the user.

As described above, the electronic device 100 may have a touch screen 110 to execute functions according to detected touches, through the method described above for implementing the user interfaces. The electronic device 100 can display shortcut keys according to detected touches, respectively. The shortcut keys may correspond to functions executed when touches are detected on areas corresponding to the display of the shortcut keys. Therefore, the electronic device can allow users to easily select and execute frequently-used functions through content displayed thereon.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for implementing user interfaces in an electronic device having a touch screen, the method comprising:
    displaying a plurality of contents on the touch screen of the electronic device, the plurality of contents corresponding to contacts stored in a phonebook;
    detecting a proximity input in close proximity to a content of the displayed contents;
    enlarging, in response to detecting the proximity input, the content while another of the displayed contents is displayed;
    displaying a shortcut key at a location adjacent to the enlarged content, the shortcut key being configured to execute a communication function associated with a contact corresponding to the enlarged content;
    executing, in response to a touch on the displayed shortcut key, the communication function to communicate with the contact; and
    executing, directly in response to a touch on the enlarged content, a modification function to enable modification of at least some data associated with the contact corresponding to the enlarged content,
    wherein displaying the shortcut key comprises:
        displaying, in response to the proximity input being detected in close proximity to the content of the displayed contents, information associated with the contact corresponding to the enlarged content; and
        displaying, in response to the proximity input being maintained for a threshold time period, the shortcut key associated with the enlarged content after displaying the enlarged content and the associated information.

2. The method of claim 1, further comprising:
  determining an execution frequency corresponding to a number of times the function corresponding to the plurality of contents has been executed; and
  setting the shortcut key to invoke the function according to the execution frequency.

3. The method of claim 1, wherein the plurality of contents further comprises a menu.

4. A device comprising a touch screen, the device comprising:
  at least one sensor configured to detect a proximity input, the proximity input being detected in response to an input tool being located within a distance of an area of the touch screen;
  a display configured to display a plurality of contents corresponding to contacts stored in a phonebook; and
  at least one processor configured to:
    control the display to display the plurality of contents,
    detect the proximity input in close proximity to a content of the displayed contents,
    enlarge, in response to the detection of the proximity input, the content while another of the displayed contents is displayed,
    control, in response to detection of the proximity input, information corresponding to the enlarged content,
    control, in response to retention of the proximity input for at least a threshold period of time, the display to display a shortcut key at a location adjacent to the enlarged content after display of the enlarged content and the corresponding information, the shortcut key being configured to execute a communication function associated with a contact corresponding to the enlarged content,
    execute, in response to a touch input on the displayed shortcut key, the communication function with the contact, and
    execute, directly in response to a touch input on the enlarged content, a modification function to enable modification of at least some data associated with the contact corresponding to the enlarged content.

5. The device of claim 4, wherein the at least one processor is further configured to:
  determine an execution frequency corresponding to a number of times the function corresponding to the plurality of contents is executed; and
  invoke the function according to the execution frequency.

6. The device of claim 4, wherein the plurality of contents further comprises a menu.

7. An apparatus, comprising:
  at least one processor; and
  at least one memory comprising computer code, the at least one memory and the computer code configured to, with the at least one processor, cause the apparatus at least to:
    display a plurality of contents corresponding to contacts;
    detect a proximity input in close proximity to a content of the displayed contents;
    enlarge, in response to detection of the proximity input, the content while another of the displayed contents is displayed;
    display, in response to detection of the proximity input, information corresponding to the enlarged content;
    display, in response to retention of the proximity input for at least a threshold period of time, a shortcut key at a location adjacent to the enlarged content after display of the enlarged content and the corresponding information, the shortcut key being configured to execute a communication function associated a contact of the contacts corresponding to the enlarged content;
    execute, in response to a touch on the displayed shortcut key, the communication function to communicate with the contact; and
    execute, directly in response to a touch on the enlarged content, a modification function to enable modification of at least some data associated with the contact corresponding to the enlarged content.

8. The apparatus of claim 7, wherein the at least one memory and the computer code are further configured to, with the at least one processor, cause the apparatus at least to:
  detect interaction with the shortcut key; and
  execute, in response to detection of the interaction, the communication function corresponding to the enlarged content in association with information.

9. The apparatus of claim 7, wherein the at least one memory and the computer code are further configured to, with the at least one processor, cause the apparatus at least to:
  determine an execution frequency corresponding to a number of times the communication function corresponding to the plurality of contents has been executed; and
  configure the shortcut key to, when interacted with, invoke the communication function based on the execution frequency.

10. The method of claim 1, further comprising:
  determining whether the detected proximity input is retained for a time period; and
  displaying the shortcut key in response to the detected proximity input being retained for at least the time period, and not displaying the shortcut key in response to the detected proximity input being retained for less time than the time period.

11. The device of claim 4, wherein:
  the at least one processor is further configured to determine whether the detected proximity input is retained for a time period; and
  the display is configured to display the shortcut key in response to the detected proximity input being retained for at least the time period, and not to display the shortcut key in response to the detected proximity input being retained for less time than the time period.

12. The apparatus of claim 7, wherein the at least one memory and the computer code are further configured to, with the at least one processor, cause the apparatus at least to:
  determine whether the detected proximity input is retained for a time period; and
  display the shortcut key in response to the detected proximity input being retained for at least the time period, and not displaying the shortcut key in response to the detected proximity input being retained for less time than the time period.

13. The method of claim 1, wherein:
  the information corresponds to address information; and
  the communication function is configured to utilize at least some of the address information.

14. The method of claim 13, wherein the function is a telephony function.

15. The method of claim 13, wherein the function is a messaging function.

\* \* \* \* \*